United States Patent [19]

Colombo et al.

[11] Patent Number: 4,464,219

[45] Date of Patent: Aug. 7, 1984

[54] VACUUM SEAL BAR

[75] Inventors: Edward A. Colombo; Gordon V. Sharps, Jr., both of Fairport, N.Y.

[73] Assignee: Mobil Oil Corporation, New York, N.Y.

[21] Appl. No.: 469,858

[22] Filed: Feb. 28, 1983

[51] Int. Cl.³ .............................................. B32B 31/18
[52] U.S. Cl. .................... 156/251; 156/285; 156/381; 156/515; 493/203; 493/205; 493/208; 493/289
[58] Field of Search ............... 156/251, 285, 381, 515; 493/189, 203, 205, 208, 289

[56] References Cited

U.S. PATENT DOCUMENTS

| | | | |
|---|---|---|---|
| 2,229,121 | 1/1941 | Nye et al. | 156/251 |
| 2,737,859 | 3/1956 | Allison et al. | 493/203 |
| 3,950,205 | 4/1976 | Hawkins et al. | 156/251 |
| 4,114,520 | 9/1978 | Achelpohl et al. | 156/515 |
| 4,198,259 | 4/1980 | Meulen | 156/515 |

FOREIGN PATENT DOCUMENTS 909075 10/1962 United Kingdom ............... 493/203

Primary Examiner—Caleb Weston
Attorney, Agent, or Firm—Alexander J. McKillop; Michael G. Gilman; Charles J. Speciale

[57] ABSTRACT

Disclosed are an apparatus and method for cutting and sealing a plastic film. The plastics film is conveyed to a sealing area which contains a sealing wire in a housing over which the plastics film is draped out of contact with the wire. The wire is preheated to a first temperature and is then heated to a second higher temperature while a differential pressure is applied to the film biasing it towards and into contact with the wire which cuts and heat seals it. By providing the heat sealing area in the outer periphery of a rotatable drum to which a continuous film is conveyed, a continuous cutting and heat sealing process can be achieved.

29 Claims, 10 Drawing Figures

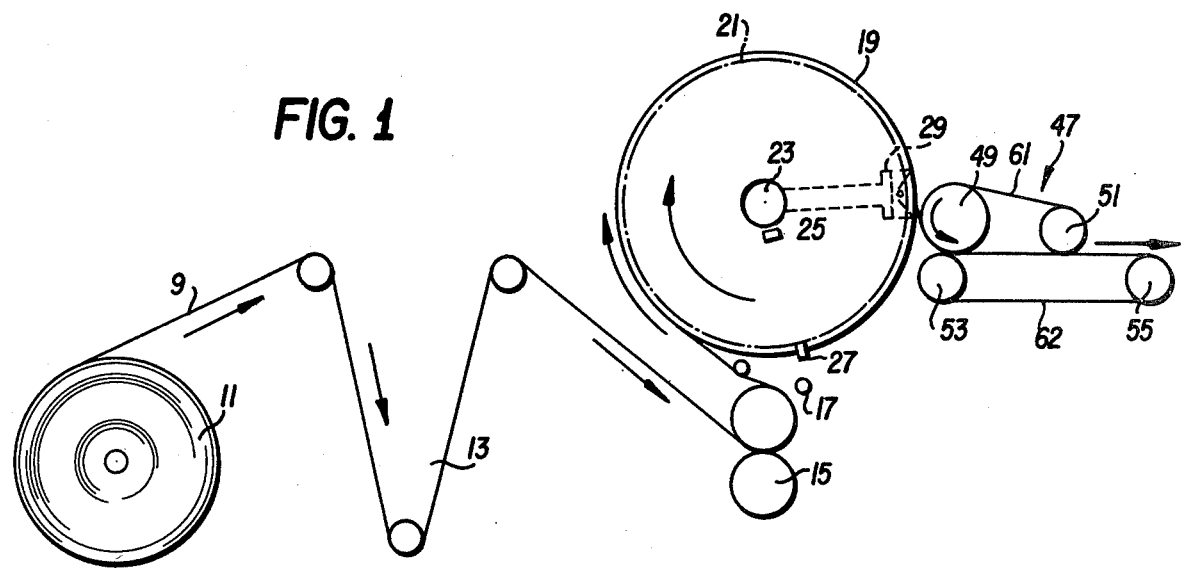
FIG. 1
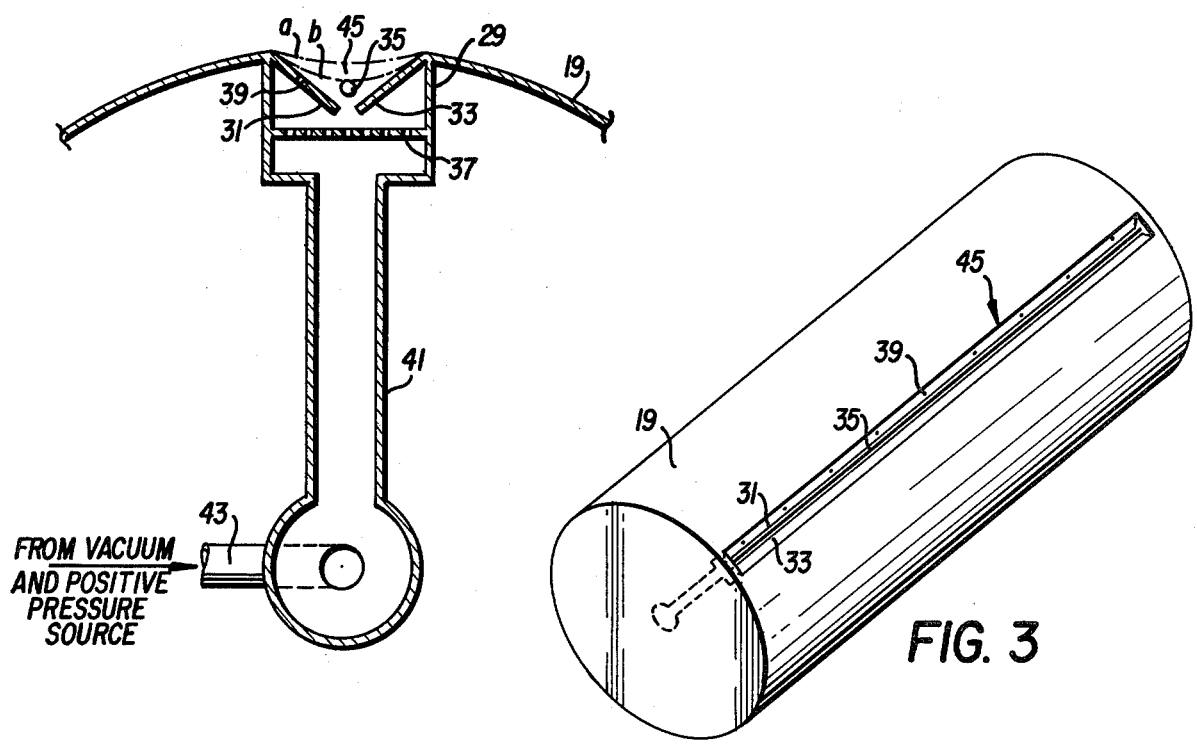
FIG. 2
FIG. 3

VACUUM SEAL BAR

BACKGROUND OF THE INVENTION

1. Field of the Invention

The present invention relates to an apparatus and a method for cutting and heat sealing a plastic film and, more particularly to a relatively inexpensive and simple apparatus and method which can be used in a highly efficient and continuous manner to cut and heat seal a continuous strip of plastic film to produce, for example, plastic bags.

2. Discussion of the Prior Art

Many different techniques have been employed in the prior art to cut and heat seal a plastic film, particularly on a continuous processing basis. Typically, a heated wire is used to cut and heat seal the film, the wire being brought into contact with the film and then separated therefrom. The mechanism employed in the prior art for moving the heated wire tends to be complex and bulky. In one known technique, for example, illustrated in U.S. Pat. No. 3,054,441, the heated wire is contained on an end of a vane which rotates to first position the wire in contact with a moving plastic film and to thereafter remove the wire from the film. While providing a good cutting and heat sealing operation, the equipment required is complex, bulky and expensive. A considerable amount of energy is also consumed just in rotating the vane. The cutting and heat sealing occurs over a very limited arc of travel, or dwell angle, of the vane which does not provide much flexibility in control of the position at which heat sealing occurs. In addition, a mechanically strong cutting and heat sealing wire is required because of the velocity of rotation of the vane. The wire therefore has a large cross-section and requires substantial amounts of energy for operation. The speed of cutting and heat sealing is also limited by the speed with which the vane may be safely rotated.

Another known technique for moving the heat sealing wire in and out of contact with a plastic film is through a reciprocation mechanism such as that illustrated in U.S. Pat. No. 3,574,039. Again, the difficulty with this type of apparatus is that it is complex, bulky and expensive to operate as considerable amounts of energy are required just to reciprocate the heated wire. In addition, the heated wire is usually in the form of a plate or bar which again consumes a considerable amount of energy in use. The cutting and heat sealing operation is also limited by the speed with which the apparatus can be reciprocated.

SUMMARY OF THE INVENTION

The present invention has been designed to considerably improve upon known methods and apparatus for cutting and heat sealing a plastic film.

One object of the invention is to provide an apparatus and method for cutting and heat sealing a plastic film which is relatively simple and inexpensive to implement.

Another object of the invention is to provide an apparatus and method for cutting and heat sealing a plastic film in which the cutting and heat sealing operation can be performed at a faster rate while making seals of lower cost.

Another object of the invention is to provide an apparatus and method for cutting and heat sealing a plastic film which permits a greater degree of control over the sequencing of operations which are required.

Another object of the invention is to provide an apparatus and method for cutting and heat sealing a plastic film which consumes less energy during operation and thus reduces the costs of making seals.

The apparatus of the invention, which achieves the above objectives, comprises a support means for receiving and supporting a plastic film, the support means having a housing associated therewith containing a heatable cutting and sealing wire; means for heating the wire to a first temperature and then to a second, higher temperature; means for applying a first differential pressure transversely across the support means to bias a plastic film which may be placed on the support means towards and into contact with the wire during the time the wire is at the second temperature; and, control means for operating the heating means and first differential pressure applying means such that the wire is first heated to the first temperature and then to the second temperature higher than the first temperature, and the first differential pressure is applied after the wire is heated to the second temperature.

The above objectives are achieved in the method of the invention which employs the steps of preheating a cutting and sealing wire to a first temperature; conveying a plastic film to and over a sealing area, the sealing area overlying the cutting and sealing wire; increasing the temperature of the cutting and sealing wire to a second temperature higher than the first; and applying a first differential pressure to the film biasing it toward and into contact with the sealing wire during the time the wire is heated to the second temperature, causing the wire to cut and seal the plastic film.

The above objectives, features and advantages and others of the invention will be more clearly discerned from the ensuing detailed description which is presented in connection with the accompanying drawings.

BRIEF DESCRIPTION OF THE DRAWINGS

FIG. 1 illustrates in side view the essential aspects of the apparatus and method of the invention;

FIG. 2 is a partial sectional view through a portion of the apparatus illustrated in FIG. 1;

FIG. 3 is a perspective view of a rotatable drum shown in FIG. 1;

DETAILED DESCRIPTION OF THE INVENTION

Figure 10:
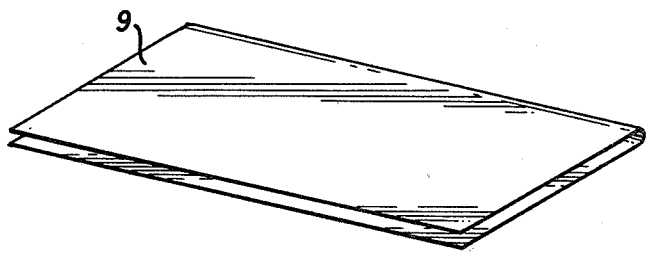

FIG. 1 is a schematic representation of the apparatus and method of the invention. A plastic film 9, shown in greater detail in FIG. 10, is taken from a film roll 11 and conveyed as a continuous sheet through an accumulator section 13, commonly termed a dancer assembly, to a pair of driven nip rollers 15 which apply the continuous plastic film 9 to the outer peripheral surface of a rotatable drum 19. The plastic film 9 revolves together with the drum 19 to a takeoff assembly 47. The takeoff assembly removes the plastic film 9 as a sequence of cut and heat sealed film segments.

Rotatable drum 19 is illustrated in greater detail in FIGS. 2 and 3. It includes a seal wire housing 29 extending axially along the drum and residing below an opening in the drum peripheral surface. A cutting and heat sealing wire 35 is disposed within and extends along housing 29, that is, axially of the drum. Wire 35 is positioned below the profile of the peripheral surface of the drum and underlies the plastic film 9 which rotates with and on the peripheral surface of the drum. The speed of rotation of the nip rollers 15 is adjusted relative to the speed of rotation of drum 19 so that the film 9 is laid on the drum in a relaxed, untaut state. Consequently, the film drapes over a sealing area 45 defined between the widthwise sides of housing 29, as shown by "a" in FIG. 2. The draping is insufficient to cause the plastic film 9 to contact with the wire 35.

Housing 29 contains a pair of angled flaps or vanes 31,33 disposed on opposite sides of wire 35. These vanes also extend axially of the drum and along housing 29. A baffle plate 37 is also provided in housing 29 extending the length of the housing and residing below flaps 31 and 33. Vane 31 also includes a plurality of apertures 39 spaced along its longitudinal extent. Housing 29 is connected to a gas pressure channel 41 provided within the drum interior which in turn is connected to a gas pressure conduit 43. The purpose of gas pressure channel 41 and associated gas pressure conduit 43 is to apply a pressurized gas, either under vacuum or positive pressure, to the interior of housing 29, as described in greater detail below.

In order to help the plastics film 9 adhere to the peripheral surface of drum 19, an electrostatic charger applier 17 may be disposed adjacent the path of film 9 prior to its contacting with the outer periphery of drum 19.

The takeoff assembly includes a vacuum roller 49 and an idler roller 51 between which are stretched a plurality of spaced takeaway belts 61. An additional pair of rollers 53 and 55, about which additional takeaway belts 62 are stretched and which also rotate also forms part of the vacuum takeaway assembly 47. The plastic film 9 is taken off the drum 9 by the vacuum takeaway assembly 47 and passes between the respective roller belts 61 and 62.

Figure 4:
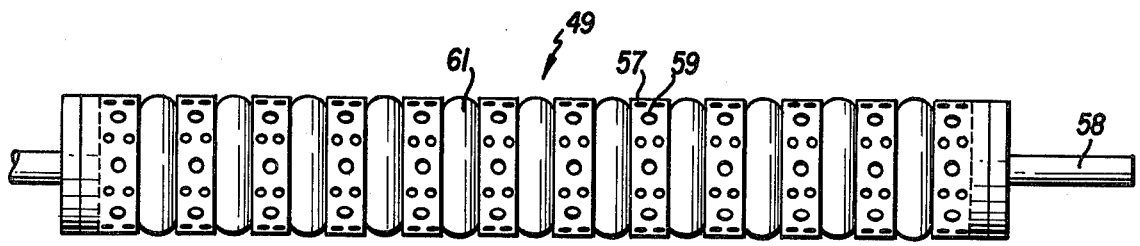
FIG. 4 is a front view of a vacuum takeaway roll which is illustrated in FIG. 1.

The vacuum roll 49 is illustrated in greater detail in FIG. 4. It includes a plurality of raised areas 57 spaced along the longitudinal extent of the roll and a plurality of recessed areas between the raised areas which contain the roller belts. Each of the raised areas 57 includes a plurality of vacuum apertures 59 on its peripheral surface which communicate with an axially aligned vacuum conduit 58.

The operation of the apparatus illustrated in FIGS. 1-4 will now be described.

The plastic film is applied to the periphery of rotating drum 19, with an electrostatic charge by means of the electrostatic charge applier 17, in a relaxed non-tensioned state. As drum 19 rotates with the film 9, so too does housing 29 and, when housing 29 underlies the plastic film 9, the film tends to drape over the housing at the sealing area 45, as shown in greater detail in FIG. 2. Before housing 29 rotates to a position where it underlies the plastic film 9, the resistance wire 35 is preheated to a first temperature which is used to help soften the film when the housing 29 underlies the same. After the film is softened, the wire 35 is then heated to a second temperature higher than the first while at the same time a differential pressure is applied across the film at the sealing area 45 in the form of a vacuum in housing 29 which biases the film towards and into contact with the heating wire 35, as further shown by "b" in FIG. 2. This causes the film to be cut and heat sealed as the housing 29 continues to rotate together with the film. After the cutting and sealing operation has occurred, the vacuum which was applied by gas pressure conduit 43 to housing 29 is removed. The temperature of the heating wire 35 is also lowered to a temperature equal to or lower than the preheat temperature.

The housing 29 continues to rotate with the drum until it reaches a position illustrated in FIG. 1, at which time a positive gas pressure is applied to conduit 43 and gas pressure channel 41 to blow the ends of the separated film away from the peripheral surface of drum 19. The apertures 39 in vane 31 ensure that the positive gas pressure blows the segmented portions of the film 9 towards the takeaway assembly 47. At this point a vacuum has been applied to the vacuum roller nip 49 which pulls the segmented plastic film from the surface of drum 19 and into the nip formed by the takeaway belts 61 and 62. As drum 19 continues to rotate the positive gas pressure in conduit 43 and housing 29 is removed and the apparatus is now ready to repeat the process and perform another cutting and heat sealing operation.

Figure 5:
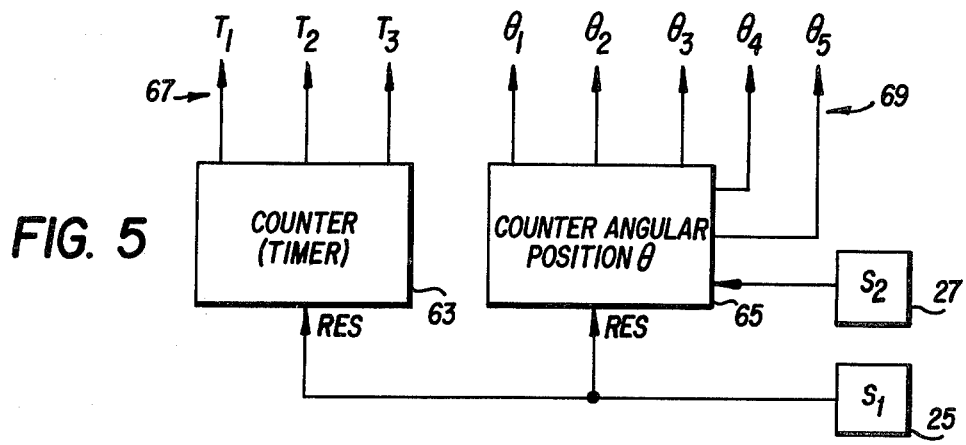
FIG. 5 is a block diagram electrical representation of a portion of the control circuit employed in the invention.
Figure 6:
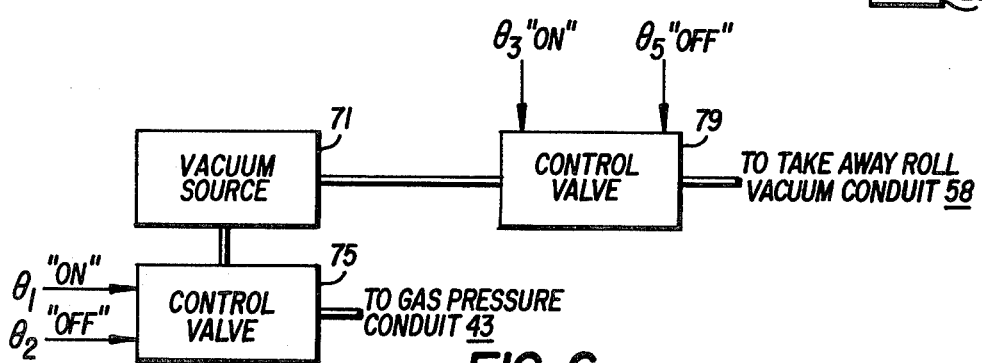
FIG. 6 illustrates in block diagram form another portion of the control circuit employed in the invention.
Figure 7:
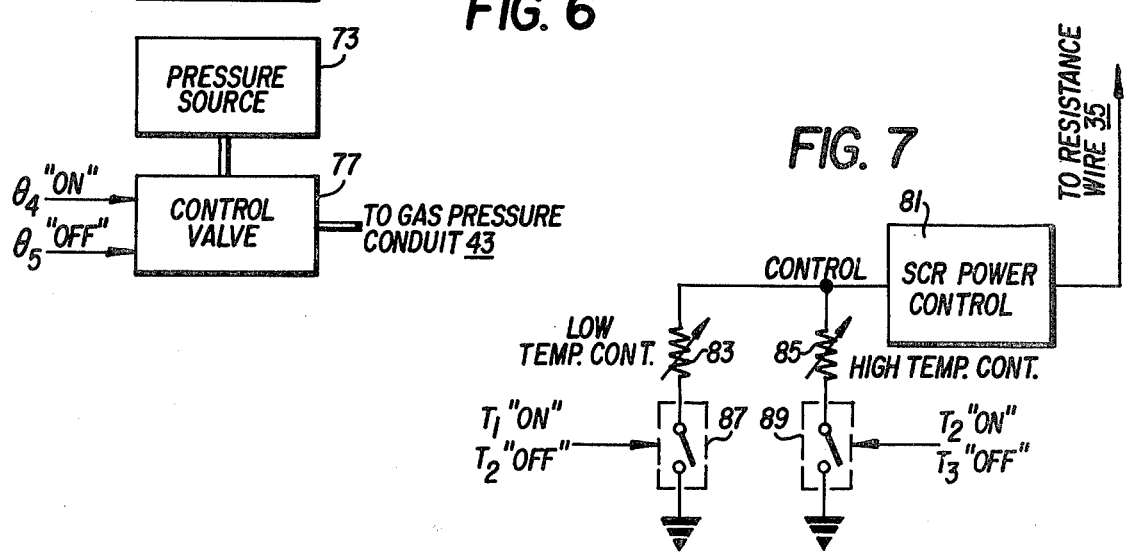
FIG. 7 illustrates another portion of the control circuit employed in the invention.
Figure 8:
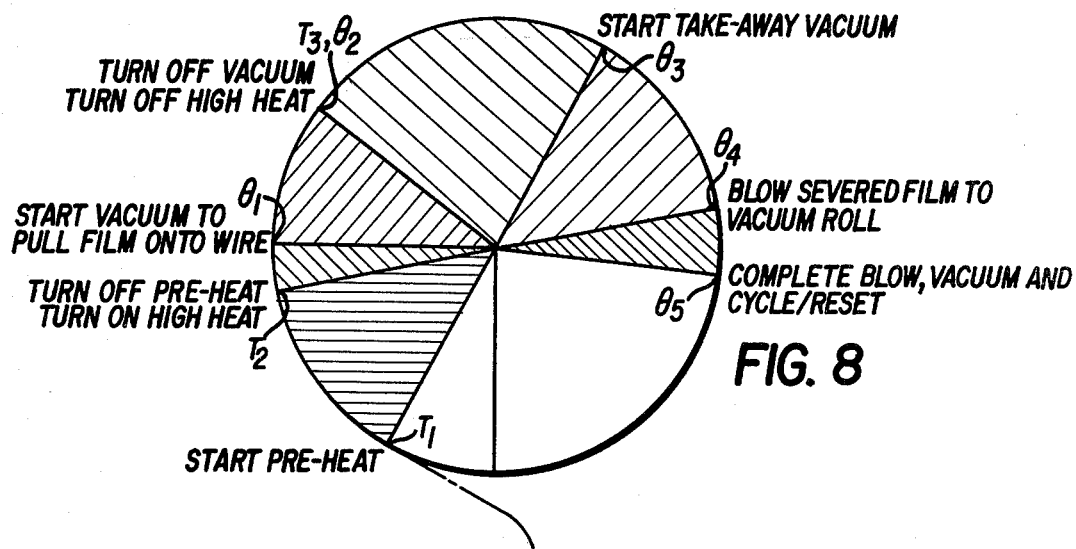
FIG. 8 is a side view diagram illustrating the timing sequence of various operations employed in the invention.
Figure 9:
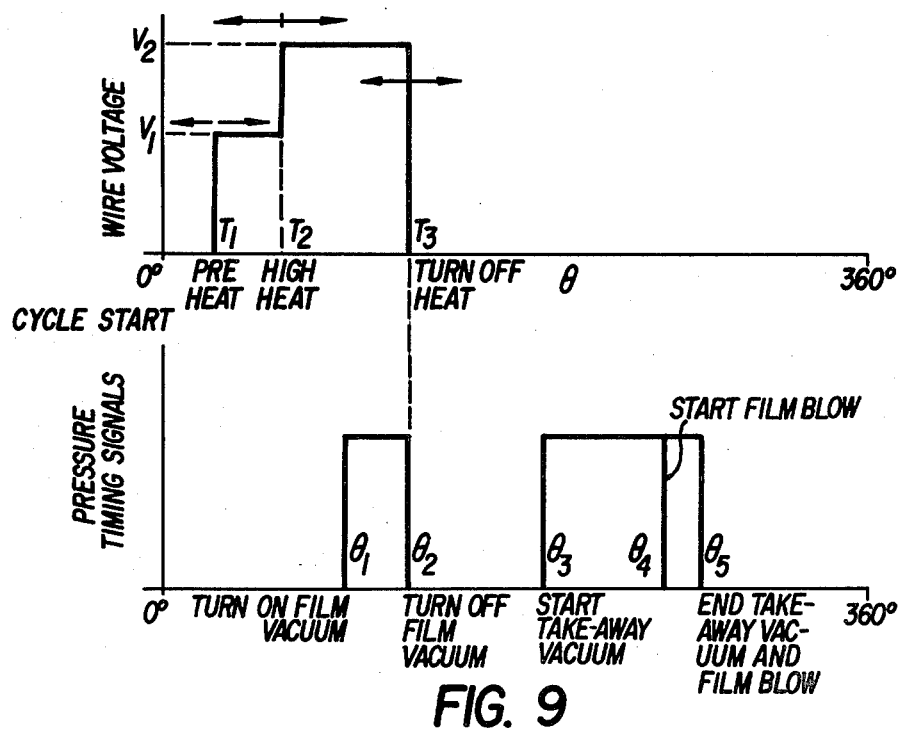
FIG. 9 illustrates the timed occurrence of various signals illustrated in FIG. 5; and, FIG. 10 illustrates a plastic film which may be cut and heat sealed using the apparatus and method of the invention.

The control apparatus for controlling the sequencing of the various operations required in the FIG. 1 apparatus is illustrated in greater detail in FIGS. 5-7, while the actual timing of the various operations is illustrated in greater detail in FIGS. 8 and 9.

Returning for a moment to FIG. 1, two rotational sensors S1 and S2 are illustrated at 25 and 27. The first rotational sensor 25 is designed to sense the rotation of shaft 23 of drum 19. A pulse signal is generated once for each revolution of a sensable area provided on the shaft and thus once for each revolution of drum 19. The other sensor S2 is an angular position sensor which is provided adjacent the periphery of a sprocket 21 which is mounted coaxial with and rotates together with the drum 19. Spocket 21 contains a number of sensable areas distributed equally about its circumferential periphery so that a plurality of equally spaced pulsed signals are generated by sensor 27 as the drum 19 completes one revolution. The outputs from sensors 25 and 27 are used to control the temperature of the wire as well as the timing of the application of gas pressure to both the housing 29 and vacuum roll nip 49. The sensors $S_1$ and $S_2$ are preferably magnetic type sensors so no actual contact between a sensable area and a sensor is required.

FIG. 5 illustrates a portion of a control circuit which generates various timing and angular position signals from the outputs of sensors 25 and 27. The output of sensor 25, which occurs once during each revolution of the drum 19, is used as a reset and start signal for two counters 63 and 65. Counter 63 is a timer counter which counts to presettable time values once reset and started. Counter 65 is an angular position counter. When it is reset and started it begins to receive the pulses from the output of the angular position sensor 27. As predetermined angular positions are reached, the angular position counter 65 supplies appropriate output signals $\theta_1 \ldots \theta_5$. As the timer counter 63 reaches predetermined time periods, it generates timing signals $T_1 \ldots T_3$.

The outputs 67,69 of the timer counter 63 and angular position counter 65 are respectively used to control the heating of the resistance wire 35 and the application of gas pressure (negative and positive) to the gas pressure conduit 43.

FIG. 6 illustrates the application of gas pressure to conduit 43 under control of the various angular position signals $\theta_1 \ldots \theta_5$. A vacuum source 71 is connected to a pair of control valves 75 and 79. The first control valve 75 is turned on when an angular position $\theta_1$ is reached and turned off when an angular position $\theta_2$ is reached. Thus, the output of control valve 75 contains a vacuum pressure during the time the drum 19 is rotating through an angular position of $\theta_1-\theta_2$. Control valve 79 on the other hand is turned on by an angular position signal $\theta_3$ and off by an angular position signal $\theta_5$. Accordingly, the output of control valve 79, which is applied to the vacuum roll conduit 58 (FIG. 4) is applied during the time the drum rotates between angular position $\theta_3-\theta_5$.

The positive pressure which is applied to conduit 43 is generated by a pressure source 73, the output of which is applied to conduit 43 through a control valve 77. Control valve 77 is turned on when drum 19 reaches an angular position corresponding to $\theta_4$ and off when the drum reaches an angular position corresponding to $\theta_5$.

Accordingly, the angular position counter 65 serves to control the application of vacuum and positive pressure to the conduit 41 as well as vacuum to the vacuum takeaway roll 49. By controlling application of vacuum with angular position sensing it is possible to precisely time the sequence of application of vacuum or positive pressure to ensure, for example, that the cut film 9 is blown at the proper angular position of drum 19 to be captured by the vacuum roll 49.

By contrast to the angular position control employed for the vacuum and gas pressure devices, the resistance wire 35 control circuit, which is illustrated in FIG. 7, is operated by the output of the timer counter 63. The heating of the resistance wire is controlled by a conventional SCR power controller 81 which receives as a control input difference resistance settings which in turn control the amount of voltage applied to resistance wire 35. The input control to SCR power controller 81 is from either a low temperature rheostat 83 or a high temperature rheostat 85, depending on which is connected in circuit to the control input of the SCR power controller. This in turn is determined by which of relays 87,89 is operated to close its respective contacts. Relay 87 is closed or turned "on" at time $T_1$ and "off" at time $T_2$, whereas relay 89 is turned "on" at time $T_2$ and "off" at time $T_3$. The relays 87,89 are therefore connected to the outputs of timer counter 63. Thus, relay 1 closes first so that a low temperature control signal is applied to the SCR power controller and thereafter the low temperature rheostat 83 is switched out of circuit and the high temperature rheostat 85 is switched in circuit with the control input to the SCR power control 81.

The timing of the various operations which occur in the apparatus and method of the invention is best illustrated in FIGS. 8 and 9. FIG. 8 illustrates in schematic form the drum 19 with the angular postion of the central housing 29 at which certain operations occur, illustrated. Starting from a bottom dead center position, preheating of wire 35 is started at a time $T_1$. This preheating occurs until a time $T_2$ at which a higher voltage is applied to wire 35 by the SCR power controller 81. At an angular position of the drum corresponding to $\theta_1$, the vacuum is applied to conduit 43 which causes the plastic film to be pulled towards and into contact with the cutting and sealing wire 35. Thereafter, as the housing 29 continues to rotate, a time $T_3$ is reached wherein the high heat is turned off. In addition, the time $T_3$ approximately corresponds to an angular position of the drum $\theta_2$ where the vacuum in conduit 43 is also removed. The film continues to rotate about the drum 19 until the housing 29 reaches an angular position corresponding to $\theta_3$, at which time the takeaway vacuum is applied to vacuum roller 49. This continues until the housing reaches an angular position corresponding to $\theta_4$, at which time the application of positive pressure to conduit 43 begins. This causes the severed film to be blown towards vacuum roll 49 which receives the film as severed segments and transports it to the nip between the roller belts 61 and 62 for removal. As the drum continues to rotate, the housing 29 reaches an angular position corresponding to $\theta_5$ where the positive pressure applied to conduit 43 and the vacuum pressure applied to vacuum roll 49 are removed. At this point in the angular position of housing 29 the system has, in effect, reset and is ready to begin another sequence of operations.

Although, as illustrated in FIG. 9, all heating of wire 35 ceases at time $T_3$, the apparatus can also be arranged so that at $T_3$, relay 87 is again energized to cause wire 35 to be heated to the preheat temperature. In this arrangement the wire 35 will alternate between a preheat temperature and a high temperature.

By making the heating of the wire controlled by time rather than angular position, one is able to easily control the time when the heating of the wire occurs and thus the position at which the film is cut. The important consideration, of course, is that the second higher temperature heat is applied to the wire 35 while the vacuum exists in conduit 43. However, within this constraint, wide latitude in the time of application of heat to the heating wire is achieved and may be controlled. The top portion of FIG. 9 illustrates, by oppositely directed arrows, the timing adjustments which can be made, by suitably setting the timer counter 63.

It should be appreciated that although a separate timing and angular position counter have been employed in the invention, all operations can be controlled simply off an angular position counter or off a timer counter.

Because the housing 29 and associated heating wire 35 continually rotate within drum 19, a high speed of operation can be effected.

FIG. 10 illustrates the type of film with which the invention may typically be used. It includes a folded film layer which has one edge which is open. By cutting and heat sealing transversely of the direction of movement of this film a plurality of bags or pockets are formed by the segmented film. This process can be typically employed to make plastic bags at a relatively high rate of production.

Because the drum 19 continually rotates and the heat sealing wire is protected within the drum periphery, the wire can be made of reduced cross-section thus requiring a reduced amount of energy for operation. Moreover, by controlling the amount of power applied to the wire by the SCR controller and relays 87 and 89, a considerable savings is obtained since the wire is not continuously energized to the temperature required for cutting. Still further, since the wire moves continuously with the drum which is rotating to convey the film, no additional structure is required for moving the heating wire into position of contact with the film thus eliminating a considerable equipment expense and the energy which would otherwise be required to move the wire.

Although one embodiment of the apparatus and method of the invention has been shown and described, it should be appreciated that many modifications may be made without departing from the spirit and scope of the invention. Accordingly, the foregoing description is not to be considered as limiting of the invention, the invention being limited solely by the claims which are appended hereto.

We claim:

1. A method for cutting and heat sealing a plastic film comprising the steps of:
    heating a cutting and sealing wire to a first predetermined temperature;
    conveying a plastic film to and over a sealing area, said sealing area overlying said cutting and sealing wire;
    heating said sealing wire to a second predetermined temperature higher than the first; and,
    applying a first differential pressure to said film biasing it toward and into contact with said sealing wire during the time said wire is heated to said second predetermined temperature, causing said wire to cut and seal said plastic film.

2. A method as in claim 1, further comprising the step of applying a second differential pressure to said film to bias it away from said sealing area, after said plastic film is cut and sealed by said wire.

3. A method as in claim 2, wherein said second differential pressure is formed by applying a positive pressure to the undersurface of said film.

4. A method as in claim 1, wherein said differential pressure is formed by applying a vacuum to that portion of an undersurface of said film which overlies said sealing area.

5. A method as in claim 1, further comprising the step of reducing the temperature of said wire to a third predetermined temperature equal to or lower than said first predetermined temperature after said plastic film is cut and sealed.

6. A method for cutting and heat sealing a plastic film comprising the steps of:
    conveying a plastic film as a continuous sheet into contact with a peripheral surface of a rotary drum containing a sealing area, said sealing area overlying a cutting and sealing wire, said sealing area being provided on the peripheral surface of said drum and said cutting and sealing wire extending axially of said drum and below an axially extending opening in the peripheral surface thereof;
    rotating said drum so that said cutting and sealing wire rotates and periodically underlies said film in contact with said drum periphery, said film and drum moving together;
    preheating said plastic film by heating said cutting and sealing wire to a first predetermined temperature before or during an initial period of contact of said plastic film with that portion of said drum periphery adjacent said sealing wire;
    thereafter increasing the temperature of said sealing wire to a second predetermined temperature higher than said first predetermined temperature and applying a first differential pressure during a later period of contact of said plastic film with said drum portion during the time said wire is heated to said second predetermined temperature to cut and seal said plastic film;
    and removing the cut and sealed plastic film at segments from the peripheral surface of said drum.

7. A method as in claim 6, further comprising the step of applying a second differential pressure to said film to bias it away from said drum after said plastic film is cut and sealed by said wire.

8. A method as in claim 6, wherein said plastic film is conveyed into contact with said drum in a relaxed state so that it initially drapes across said sealing area out of contact with said sealing wire.

9. A method as in claim 7, wherein said second differential pressure is formed by applying a positive pressure to the undersurface of said film.

10. A method as in claim 6, further comprising the step of electrostatically charging said film before it contacts with said rotary drum.

11. A method as in claim 6, further comprising the step of reducing the temperature of said wire to a third predetermined temperature equal to or lower than said first predetermined temperature after said plastic film is cut and sealed.

12. A method as in claim 7, wherein the application of said second differential pressure ends after said plastic film segments are removed from the peripheral surface of said drum.

13. A method as in claim 12, wherein said wire is heated to said first predetermined temperature during a portion of the revolution of said drum which occurs prior to or after contact of said plastic film with said sealing area and is heated to said second predetermined temperature during a portion of the revolution of said drum which occurs when the plastic film is in contact with said sealing area, and said wire is reduced in temperature from said second predetermined temperature after said plastic film is cut and sealed.

14. A method as in claim 13, wherein said first differential pressure is applied after the heating of said wire to said second predetermined temperature, and the second differential pressure is applied after said wire is reduced in temperature from said second predetermined temperature.

15. A method as in claim 6, wherein said first differential pressure is formed by applying a vacuum to that portion of an undersurface of said film which overlies said sealing area.

16. An apparatus for cutting and sealing a plastic film comprising:
    a support means for receiving and supporting a plastic film, said support means having an opening and a housing underlying said opening and containing a heatable cutting and sealing wire;
    means for heating said wire;
    means for applying a first differential pressure to bias a plastic film which may be placed on said support means towards and into contact with said wire; and
    control means for operating said heating means and first differential pressure applying means such that said wire is heated to a first predetermined temperature and is thereafter heated to a second predetermined temperature higher than the first, and said differential pressure is applied during the time said wire is heated to said second predetermined temperature.

17. An apparatus as in claim 16, wherein said first differential pressure applying means comprises a controllable vacuum source which is connected to said housing to apply a vacuum to the underside of a plastic film supported by said support means.

18. An apparatus as in claim 16, further comprising a means for applying a second differential pressure to bias said plastic film away from said support means, said second differential pressure being applied under control of said control means after said plastic film is cut and sealed by said wire.

19. An apparatus as in claim 18, wherein said means for applying said second differential pressure applies a positive pressure to said housing.

20. An apparatus as in claim 19, further comprising means for removing cut and sealed plastic film segments from said support means and wherein said control means discontinues operation of said means for applying said second differential pressure after said plastic film segments are removed from said support means.

21. An apparatus for cutting and sealing a plastic film comprising:
a rotatable drum for receiving and supporting a plastic film, said rotatable drum having an opening and a housing underlying said opening and containing a heatable cutting and sealing wire, said housing being located below and extending axially of and along a portion of the outer peripheral surface of said rotatable drum, said wire extending axially of said rotatable drum in said housing and being spaced below said opening in the peripheral surface of said rotatable drum;
means for heating said wire;
means for applying a first differential pressure to bias a plastic film placed on said rotatable drum towards and into contact with said wire; and
control means for operating said heating means and first differential pressure applying means such that said wire is heated to a first predetermined temperature and is thereafter heated to a second predetermined temperature higher than the first, and said first differential pressure is applied during the time said wire is heated to said second predetermined temperature.

22. An apparatus as in claim 24, further comprising first conveying means for conveying a plastic film to the outer peripheral surface of said rotatable drum and second conveying means for conveying cut and sealed plastics film segments away from the outer peripheral surface of said rotatable drum.

23. An apparatus as in claim 22, wherein said first conveying means comprises a roller assembly including an accumulator section and drive rollers for gripping and moving said plastic film.

24. An apparatus as in claim 22, wherein said first differential pressure applying means comprises a controllable vacuum source which is connected to said housing to apply a vacuum to the underside of a plastic film supported by said drum.

25. An apparatus as in claim 22, wherein said second conveying means comprises a vacuum takeaway system including a vacuum drum positioned adjacent the peripheral surface of said rotatable drum.

26. An apparatus as in claim 21, further comprising a means for applying a second differential pressure to bias said plastic film away from said drum, said second differential pressure being applied under control of said control means after said plastic film is cut and sealed by said wire.

27. An apparatus as in claim 21, wherein said control means operates said heating means and first differential pressure applying means such that said wire is heated to said first predetermined temperature during a portion of the revolution of said drum which occurs prior to or after contact of said plastic film with said sealing area, and is heated to said second predetermined temperature during a portion of the revolution of said drum which occurs when the plastic film is in contact with said sealing area, and said wire is reduced in temperature to a third temperature value equal to or lower than said first temperature value, after said plastic film is cut and sealed.

28. An apparatus as in claim 26, wherein said means for applying said second differential pressure applies a positive pressure to said housing.

29. An apparatus as in claim 28, further comprising means for removing cut and sealed plastic film segments from said drum and wherein said control means discontinues operation of said means for applying said second differential pressure after said plastic film segments are removed from said drum.

* * * * *